US009488314B1

(12) United States Patent
Alshafai

(10) Patent No.: US 9,488,314 B1
(45) Date of Patent: Nov. 8, 2016

(54) PUMP-LESS INFLATION DEVICE AND INFLATION METHOD USING CONSECUTIVE CHEMICAL REACTIONS

(71) Applicant: Ali Salman Alshafai, Silver Spring, MD (US)

(72) Inventor: Ali Salman Alshafai, Silver Spring, MD (US)

( * ) Notice: Subject to any disclaimer, the term of this patent is extended or adjusted under 35 U.S.C. 154(b) by 68 days.

(21) Appl. No.: 14/689,813

(22) Filed: Apr. 17, 2015

(51) Int. Cl.
*B60S 5/04* (2006.01)
*F17C 7/00* (2006.01)

(52) U.S. Cl.
CPC .. *F17C 7/00* (2013.01); *B60S 5/04* (2013.01); *F17C 2201/058* (2013.01); *F17C 2205/0335* (2013.01); *F17C 2205/0338* (2013.01); *F17C 2205/0394* (2013.01); *F17C 2221/014* (2013.01); *F17C 2223/031* (2013.01); *F17C 2225/0123* (2013.01); *F17C 2225/033* (2013.01); *F17C 2225/035* (2013.01); *F17C 2265/06* (2013.01)

(58) Field of Classification Search
CPC ...... B60S 5/04; F17C 7/00; F17C 2201/058; F17C 2205/0338; F17C 2205/0335; F17C 2205/0394; F17C 2225/0123; F17C 2225/033; F17C 2225/035; F17C 2221/014; F17C 2223/031; F17C 2265/06
USPC ................. 141/37–38, 82, 98, 329
See application file for complete search history.

(56) References Cited

U.S. PATENT DOCUMENTS

| 3,515,181 | A | * | 6/1970 | Sperberg | ................ | B60C 5/001 141/38 |
| 4,062,288 | A | | 12/1977 | Millray | | |
| 4,097,241 | A | | 6/1978 | Garner et al. | | |
| 4,877,264 | A | * | 10/1989 | Cuevas | ................... | B60R 21/30 280/731 |
| 4,909,549 | A | * | 3/1990 | Poole | ....................... | C06D 5/06 149/2 |
| 5,551,725 | A | * | 9/1996 | Ludwig | ................ | B60R 21/264 102/531 |
| 6,510,875 | B2 | * | 1/2003 | Fang | ..................... | B29C 73/163 141/100 |
| 6,605,654 | B1 | * | 8/2003 | Fang | ..................... | B29C 73/163 523/166 |

FOREIGN PATENT DOCUMENTS

EP        0 467 594 A1    11/1991
WO   WO 2012/108764 A1   8/2012

* cited by examiner

*Primary Examiner* — Nicolas A Arnett
(74) *Attorney, Agent, or Firm* — Oblon, McClelland, Maier & Neustadt, L.L.P.

(57) ABSTRACT

A pump-less inflation device including a hollow conical casing, a puncturable membrane, a one-way valve that allows gas egress from the casing, a first chemical that reacts with oxygen and generates heat, and a second chemical that decomposes when heated and releases nitrogen gas. A method of inflating an inflatable object using the inflation device whereby the puncturable membrane is punctured with a puncturing device to allow oxygen to enter the inflation device and react with the first chemical, which generates heat and decomposes the second chemical, which releases nitrogen gas that escapes from the narrow first end of the inflation device. The inflatable object is inflated with the released nitrogen gas.

19 Claims, 3 Drawing Sheets

PUMP-LESS INFLATION DEVICE AND INFLATION METHOD USING CONSECUTIVE CHEMICAL REACTIONS

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

1. Field of the Disclosure

The present disclosure relates to pump-less inflation device that operates using consecutive chemical reactions. The present disclosure also relates to a method of inflating an inflatable object using the inflation device.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many objects require air pressure to function. These objects include car tires, air mattresses, inflatable boats, air bags, and life preservers. Therefore, many different types of inflation devices have been invented for inflation purposes. Some of the most common devices include manual air pumps (foot or hand activated pumps), electric air pumps, and compressed air pumps. While manual and compressed air pumps may be portable, the portable versions are typically used to inflate smaller objects. Electric pumps on the other hand, tend not to be portable, and even in instances where they are portable, they nonetheless require access to an electrical source. Further, all of these developed inflation systems function by pumping atmospheric air into the inflatable object. Oxygen gas is an oxidant and will over time corrode and rot materials that make up the inflatable object, such as the rubber used in common car tires. Another downside of using atmospheric oxygen, is that oxygen has a fast rate of diffusion, causing the inflated object to lose pressure at a fast rate.

With this in mind, inflation devices using a chemical reaction have been disclosed, which produce a gas such as nitrogen or carbon dioxide to overcome the problems associated with molecular oxygen. These inflation devices can be used to inflate large or small objects depending on the amounts of chemicals utilized, and are therefore portable alternatives to manual pumps and compressed gas pumps. Similar to airbag inflation technology, these inflation devices work by mechanically or electrically igniting a chemical, for instance with a striker or igniter, to produce a volume of gas which then inflates an object. One such strategy involves mechanically lighting an azide to produce nitrogen gas [Garner, E. et al. U.S. Pat. No. 4,097,241A; Millray, R. U.S. Pat. No. 4,062,288A; Ball, D. et al. EP467594A1—each incorporated by reference in its entirety]. Further, Schuurbiers, C. et al. [WO2012108764A1—incorporated herein by reference in its entirety] disclosed a device the uses an electrical igniter to decompose a $CO_2$-generating compound.

However, none of these strategies provide an inflation device that uses molecular oxygen as the ignition source, whereby molecular oxygen initiates consecutive chemical reactions to produce an inflation gas. By using molecular oxygen as the ignition source, no bulky or expensive mechanical or electrical strikers are needed to initiate the inflation system.

In view of the forgoing, the present invention relates to a portable inflation device and an inflation method using consecutive chemical reactions to generate a nitrogen inflation gas using atmospheric oxygen as the ignition source.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to a first aspect, the present disclosure relates to a pump-less inflation device including i) a hollow conical casing with a narrow first end that is connected to an inflation pin and a wide second end ii) a puncturable membrane that covers and seals the wide second end iii) a one-way valve located proximal to the narrow first end, that prevents gas ingress into the inflation device, and allows gas egress from the hollow interior through the inflation pin at the narrow first end when a pressure threshold is reached iv) a first chemical that reacts with oxygen and generates heat and v) a second chemical that decomposes when heated and releases nitrogen gas. The puncturable membrane and the one-way valve of the present disclosure together seal the hollow conical casing, and puncturing the puncturable membrane allows atmospheric oxygen to enter the inflation device and react with the first chemical, which generates heat and decomposes the second chemical, which releases nitrogen gas that escapes from the narrow first end of the inflation device.

In one embodiment, the sealed hollow conical casing is filled with an inert gas.

In one embodiment, the sealed hollow conical casing is evacuated such that substantially no oxygen gas is present.

In one embodiment, the first chemical is sodium metal, potassium metal, iron sulfide, potassium graphite, Raney nickel or white phosphorous.

In one embodiment, the second chemical is sodium azide, tetrazole, bistetrazole, bistetrazoleamine, dihydrazinotetrazine, or bistetrazoylaminotetrazine.

In one embodiment, the wt % of the first chemical is 10-90% relative the total weight of the first and the second chemical.

In one embodiment, the pump-less inflation device further comprise a gas permeable partition located in between the narrow first end and the wide second end of the hollow conical casing, wherein the first chemical, the second chemical, or both are located in between the partition and the wide second end, and the gas permeable partition prevents solids from passing through the partition and escaping from the narrow first end.

In one embodiment, the gas permeable partition is in the form of a double-walled gas permeable partition, and the first chemical, the second chemical, or both are enclosed within the double-walled gas permeable partition.

In one embodiment, the pump-less inflation device further comprises a coolant that cools the nitrogen gas released by the second chemical prior to escaping from the narrow end of the inflation device.

In one embodiment, the coolant is a magnesium salt, sand, or steel.

In one embodiment, the wt % of the coolant is 40-90% relative to the total wt of the coolant, the first chemical, and the second chemical.

In one embodiment, the pump-less inflation system further comprises an insulating layer that covers the exterior of the conical casing.

In one embodiment, the pump-less inflating system further comprises a pressure relief device located in the conical casing that releases excess pressure within the inflation device.

In one embodiment, the pressure relief device is a rupture disc or a pressure relief valve.

In one embodiment, the pump-less inflation device further comprises a liquid sealant, which escapes from the narrow first end of the inflation device when contacted by the released nitrogen gas.

In one embodiment, the pump-less inflation further comprises a pressure gauge.

According to a second aspect, the present disclosure relates to a method of inflating an inflatable object, comprising i) inserting the inflation pin of the pump-less inflation device, in one or more of its embodiments, into an air valve of the inflatable object ii) puncturing the puncturable membrane with a puncturing device to allow oxygen to enter the inflation device and react with the first chemical, which generates heat and decomposes the second chemical, which releases nitrogen gas that escapes from the narrow first end of the inflation device and iii) inflating the inflatable object with the released nitrogen gas.

In one embodiment, the puncturing device punctures the membrane to allow oxygen to enter the inflating device, and re-seals the punctured membrane to prevent nitrogen gas from egressing from the wide second end.

In one embodiment, the inflatable object is a tire, a boat, or an air mattress.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
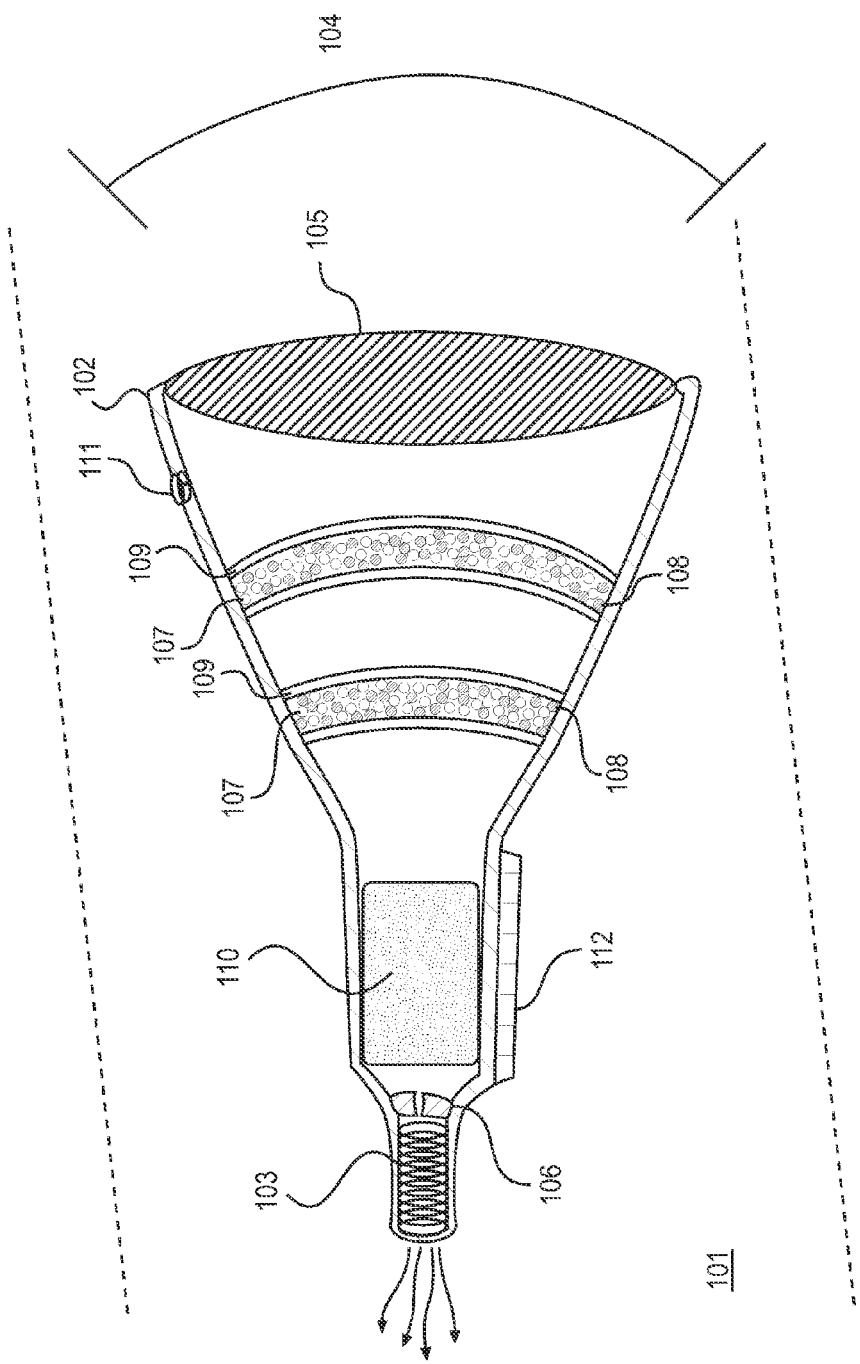
FIG. 1 is an illustration of the pump-less inflation device with the coolant bed.

Referring now to the drawings, wherein like reference numerals designate identical or corresponding parts throughout the several views.

Figure 2:
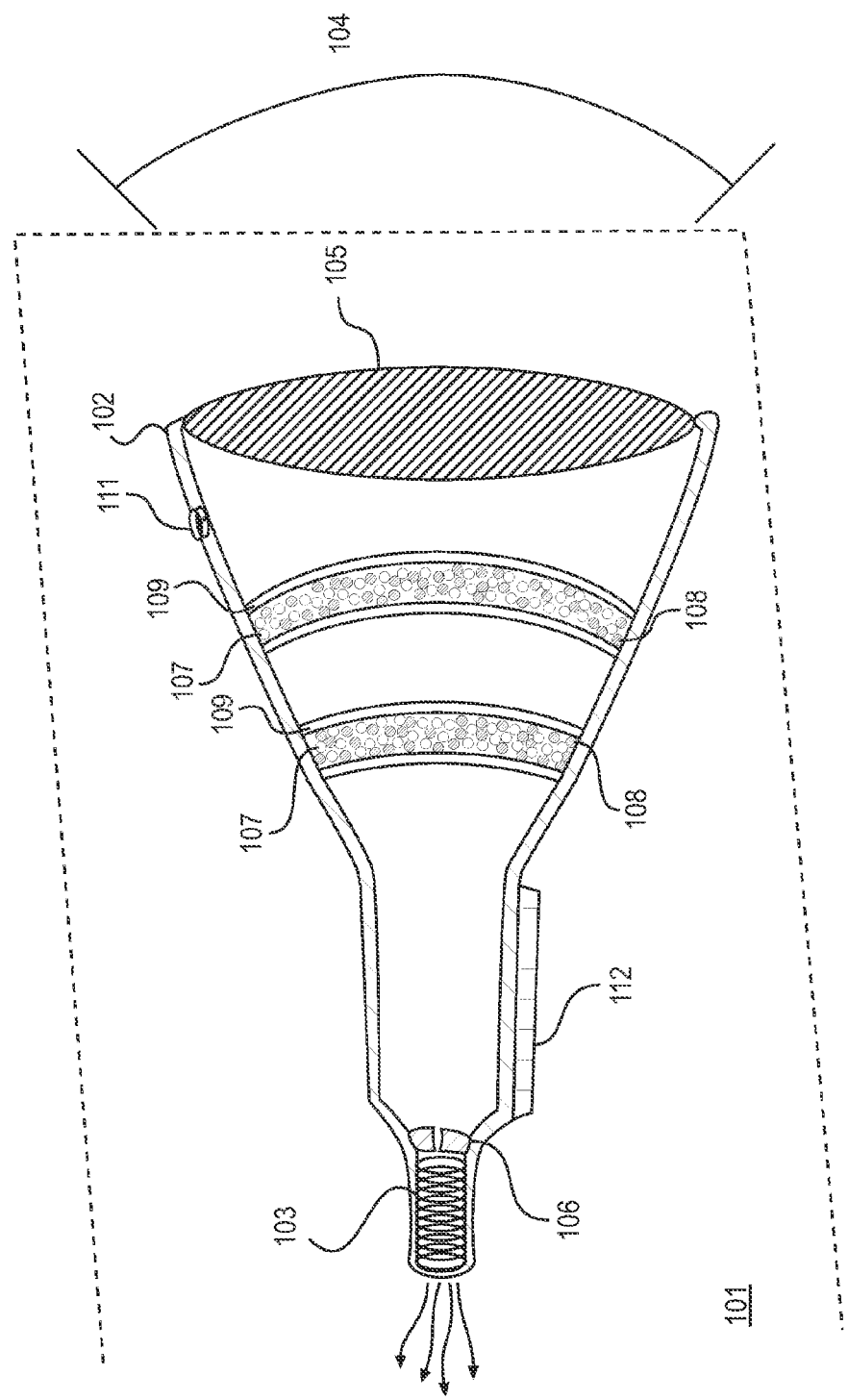
FIG. 2 is an illustration of the pump-less inflation device without the coolant bed.

Referring now to FIG. 1 and FIG. 2. The inflation is a light, portable tire inflator that is designed to be carried or held in one hand. The inflation device may therefore be stored in a limited space, such as an automobile, and used to inflate an inflatable object in need of increased pressure, or in emergency situations (e.g. a flat tire).

According to a first aspect, the present disclosure relates to a pump-less inflation device 101 including a hollow conical casing 102 with a narrow first end 103 that is connected to an inflation pin and a wide second end 104.

Such a configuration is representative of a style of casing with specific characteristics which fulfill the requirements of the basic principles of the invention. However, it is intended that other forms of casing may be employed, of any design or shape which gives the specified results. Thus the casing may be a unit of any design which encases the contents of the inflation device and provides a vessel for producing nitrogen gas using chemical reactions, and enables the produced gas to be directed into an inflatable object. Other exemplary shapes of the casing may include, a rectangular shape, a cylindrical shape, a square based pyramid, a triangular based pyramid, a triangular prism, a semi-sphere, and the like.

The pump-less inflation device may have a variety of sizes, depending on the particular application. For instance, a larger inflation device may be used to inflate a truck tire, whereas a smaller inflation device may be used to inflate an air mattress. The larger sized inflation device may be able to hold more chemicals, which would produce more inflation gas. Exemplary dimensions of the conical casing include a length of 0.5-1.5 ft and a widest diameter of 3-9 inches, although these dimensions are just one example of the casing size and are meant to be non-limiting.

One feature of the conical casing involves its use as a pressure vessel, whereby the casing is designed to withstand any internal pressure buildup during inflation. The conical casing may therefore be made of any non-reactive, strong, and durable material. Exemplary conical casing materials include, but are not limited to, metals (e.g. steel, copper, hastelloy etc.), composite materials (e.g. filament wound composites of carbon or glass fibers around a polymer), and polymers (e.g. polyethylene terephthalate, PET).

In one embodiment, the narrow first end of the conical casing is adapted to attach to an inflation pin or another connection device, such as a hose or tube, which fluidly connects the inflation device to a nozzle of an inflatable object. In an alternative embodiment, the narrow first end of the casing may attach directly to a nozzle of an inflatable object without any type of connector (tube, etc.). For example, the direct connection may be made between the inflation device and an inflatable object by screwing the narrow end of the inflation device to an inflatable object valve. It is advantageous that the narrow first end of the casing be flexible, or partially flexible, to enable a more facile connection to an inflation valve of an inflatable object. Therefore, the inflation device may be connected to the inflatable object at an angle or a slight angle when a direct linear connection is not feasible. In this scenario, the casing around the first narrow end may be thin, when compared to the thickness of the casing around other parts of the inflation device, to allow for increased flexibility. In order to maintain structural integrity at the narrow first end, the inflation device may contain a spring or coil, which will provide the advantageous flexibility properties while also offering structural support at the narrow first end (see FIG. 1).

The pump-less inflation device also includes a puncturable membrane 105 that covers and seals the wide second end. The puncturable membrane is designed to seal the wide second end of the inflation device, and to also allow the ingress of molecular oxygen when punctured. Therefore, the puncturable membrane creates an air-tight seal when the inflation device is not in use, yet is susceptible to a piercing device when used for inflating.

The puncturable membrane may be made from silicone, an unsaturated rubber, a saturated rubber, a polymeric film, polymeric-woven fabrics etc. Examples of puncturable membrane materials include polyurethane, polyester, polyvinylchloride, polyethylene, silicone, silnylon, Gortex, polyamides, acrylonitrile, polyisoprene, polybutadiene, butyl rubber, styrene-butadiene rubber, nitrile rubber, ethylene propylene rubber, viton, tecnoflon, Kalrez, polyether block amides, ethylene-vinyl acetate, and polyacrylic rubber.

Further, the pump-less inflation device incorporates a one-way valve 106 located proximal to the narrow first end, which prevents gas ingress into the inflation device, and allows gas egress from the hollow interior through the inflation pin at the narrow first end when a pressure threshold is reached. One-way valves, also called check valves, allow fluid (liquid or gas) to flow through it in only one direction.

In one embodiment, the one-way valve of the present disclosure is a ball check valve, a diaphragm check valve, a swing check valve, a stop-check valve, a lift-check valve, an in-line check valve, or a duckbill valve.

In a preferred embodiment, the one-way valve is positioned near the narrow first end of the inflation device. For example, the one-way valve is located 90-99, preferably 92-97, more preferably 94-96% of the length of the inflation device, where the wide second end is 0% and the narrow first end is 100%.

When the inflation device is dormant, the one-way valve generates a seal whereby substantially no gas may enter or exit the inflation device. Therefore, the one-way valve, together with the membrane covering the wide second end creates an air-tight seal in regard to the inflation device as a whole. An important concept in one-way valves is the cracking pressure, which is the minimum upstream pressure at which the valve will operate. Typically the one-way valve is designed for and can therefore be specified for a specific cracking pressure. Once the cracking pressure is exceeded, the one-way valve will open and allow the pressurized gas from within the casing to pass through it and out of the inflation device. In one embodiment, the cracking pressure of the one-way valve in the present disclosure is 30-50, more preferably, 35-45, even more preferably 38-42 psi.

In one embodiment, the sealed hollow conical casing is filled with an inert gas.

In one embodiment, the inert gas is nitrogen, argon, helium, neon, krypton, or xenon. In one embodiment, the inert gas is nitrogen.

In one embodiment, the sealed hollow conical casing is evacuated such that substantially no oxygen gas is present. In one embodiment, the hollow conical casing is under a reduced pressure and the pressure is 0.001-100, preferably 0.1-50, more preferably 1-30, even more preferably 2-10 Torr.

The pump-less inflation device contains a first chemical 107 that reacts with oxygen and generates heat.

In chemistry, chemicals that react or ignite spontaneously with oxygen and generate heat are termed "pyrophoric". Specifically, a pyrophoric substance ignites spontaneously in air at or below 55° C. Pyrophoric materials are often used in applications where spark generation is desired, including lighters and other fire starters.

In terms of the present disclosure, the first chemical is a pyrophoric material that reacts with incoming oxygen (i.e. through the pierced membrane covering the wide second end), and this reaction produces a spark or flame that will be utilized in a subsequent chemical reaction.

In one embodiment, the first chemical is sodium metal, potassium metal, iron sulfide, potassium graphite, Raney nickel or white phosphorous. It is not required that the first chemical of the present disclosure be pure, or contain only one type of pyrophoric material. Therefore, the "first chemical" may refer to a combination or a mixture of pyrophoric materials, and the mixture may include the same or different weight percentages.

In one embodiment, the first chemical is Raney nickel. In an alternative embodiment, the first chemical is iron sulfide.

Other examples of pyrophoric materials that are suitable as the first chemical in the present disclosure include finely divided metals (iron, aluminum, magnesium, calcium, zirconium, uranium, titanium, bismuth, hafnium, thorium, osmium, neodymium), diethylethoxyaluminum, dichloro (methyl)silane, methane tellurol, and palladium on carbon.

Further, the pump-less inflation device contains a second chemical 108 that decomposes when heated and releases nitrogen gas. In terms of the present disclosure, the flame or heat generated from the first chemical causes a decomposition of the second chemical. Said decomposition results in the production of molecular nitrogen. These "heat-sensitive" materials have low thermal decomposition temperatures.

Thermal decomposition, or thermolysis, is a chemical decomposition caused by heat. The decomposition temperature of a substance is the temperature at which the substance chemically decomposes. The reaction is usually endothermic as heat is required to break chemical bonds in the compound undergoing decomposition. In order to release nitrogen gas, the second chemical is a nitrogen containing, or nitrogen rich chemical species, such as a nitrate, a nitrite, a nitro, an azide, or an organic molecule that contains a greater number of nitrogen atoms than carbon atoms. A "propellant" in the present disclosure refers to a chemical substance used in the production of pressurized gas (i.e. $N_2$ gas). Common propellants are energetic materials that are burned or otherwise decomposed to produce the propellant gas.

An azide is a compound containing the group with the formula $N_3$, either in anionic form ($N_3^-$) or as a functional group (—$N_3$) in an organic molecule. The dominant application of azides is as a propellant in air bags. Exemplary azides that may act as propellants include sodium azide, lead azide, and 2-Dimethylaminoethylazide (DMAZ). These azides are explosophores and thermally decompose around 250-350° C. to produce nitrogen gas as one of the byproducts.

Tetrazoles are a class of synthetic organic heterocyclic compounds, consisting of a 5-member ring of four nitrogen and one carbon atom. Some tetrazole derivatives with high energy have been investigated as high performance explosives and solid rocket propellant formulations. These high performance explosive/propellant tetrazoles, like azides, also generate nitrogen gas upon thermal decomposition.

In one embodiment, the second chemical is sodium azide, tetrazole, bistetrazole, bistetrazoleamine, dihydrazinotetrazine, or bistetrazoylaminotetrazine.

In one embodiment, the second chemical is sodium azide.

It is not required that the second chemical of the present disclosure be pure, or contain only one type of heat-sensitive material. Therefore, the "second chemical" may refer to a combination or a mixture of heat-sensitive materials, and the mixture may include the same or different weight percentages.

In one embodiment, the wt % of the first chemical is 10-90%, preferably 20-80%, more preferably 30-70% relative the total weight of the first and the second chemical.

The pump-less inflation system therefore functions using atmospheric oxygen as the initiator, whereby the puncturable membrane and the one-way valve of the present disclosure together seal the hollow conical casing, which keeps the first and second chemical dormant, or in a non-reactive state. Puncturing the puncturable membrane allows atmospheric oxygen to enter the inflation device and react with the first chemical, which generates heat and decomposes the second chemical, which releases nitrogen gas that escapes from the narrow first end of the inflation device. Therefore, the inflation device of the present disclosure involves consecutive chemical reactions, or tandem reactions, whereby the first reaction produces a first product (i.e. heat), which is then reacts with the second chemical in a second reaction to generate a second product, namely nitrogen gas. In this scenario, the second reaction to produce nitrogen gas does not take place without the first chemical reacting with oxygen gas in a first reaction. Therefore, the reaction involves converting oxygen as a reactant into nitrogen gas as a product.

One advantage of using the pump-less inflation device of the present disclosure is that the device produces nitrogen gas, which is used to inflate an inflatable object, as opposed to atmospheric air or pure oxygen. As an oxidant, oxygen gas will over time corrode and rot materials that make up the inflatable object, such as the rubber used in common car tires. Nitrogen gas is an inert gas, and thus will not corrode the rubber or other material that is used in inflatable objects. Further, nitrogen gas has a slower diffusion rate than molecular oxygen. A tire inflated with nitrogen will therefore maintain a tire pressure longer than a tire inflated with oxygen, which leads to better fuel economy, and lessens leaks from tire punctures and tire patches from tire punctures, etc.

It is advantageous that the first and second chemical are chemically compatible with one another, i.e. will not react with each other when mixed together. However, the inflation device of the present disclosure may still operate as intended using a first and second chemical that are not chemically compatible i.e. that will react with each other upon mixing. In this scenario, the first and second chemical may be physically separated from one another within the inflation device through the use of barriers, membranes, pockets, dividers, partitions, or any other type of structural barrier that creates a physical separation. In this case, the heat generated from the first chemical may still react with the physically separated second chemical to continue the consecutive reactions. Under conditions in which the first and second chemical are chemically compatible, a physical barrier may still be used to separate the chemical mixture from the other parts of the inflation device.

In one embodiment, the pump-less inflation device further comprises a gas permeable partition 109 located in between the narrow first end and the wide second end of the hollow conical casing, wherein the first chemical, the second chemical, or both are located in between the partition and the wide second end, and the gas permeable partition prevents solids from passing through the partition and escaping from the narrow first end. The gas permeable partition may be made of any material that is non-reactive towards the first and second chemicals and that is also heat conductive. In one embodiment, the gas permeable partition may be made of metal, ceramic, glass, plastic, or any combination thereof. When made of a material that is not naturally porous to enable the passage of gas, the partition may be manufactured with porous properties (e.g. fritted glass) that allows gas to pass through the partition, but prevents the passage of solids.

In one embodiment, the pump-less inflation system may have multiple partitions, which forms different segments within the device. In this scenario, it is possible that the first and second chemicals are stored together within the same segment. Alternatively, the first and second chemicals may be stored in separate segments, wherein the partitions keep the first and second chemical separate.

In one embodiment, the gas permeable partition is in the form of a double-walled gas permeable partition (as depicted in FIG. 1), and the first chemical, the second chemical, or both are enclosed within the double-walled gas permeable partition. In one embodiment, the distance between the two walls of the double-walled partition is less than 5 cm, preferably less than 3 cm, preferably less than 2 cm, thus forming a thin space where the chemicals of the present disclosure can be stored.

In one embodiment, the pump-less inflation system may include a plurality of double-walled partitions. In one embodiment, the first chemical is stored in a first double-walled partition and the second chemical is stored in a second double-walled partition, which is separated from the first partition. In one embodiment, the first chemical and the second chemical are mixed and stored together in the plurality of double-walled partitions.

In one embodiment, the pump-less inflation device is designed for one-time use. However, it is envisaged that the inflation device may be adapted to function as a reusable inflation system. Towards this end, the chemicals may be reloaded into the inflation device as pre-packaged units (cartridges, pods, etc.). These pre-packaged units may be packaged under inert atmosphere, to enable a user to easily handle the pyrophoric chemical. It would be advantageous that the pre-packaged chemicals be contained in the partition of the present disclosure for easy re-charging. The puncturable membrane may also be replaced, or advantageously simply reused.

In one embodiment, the pump-less inflation device further comprises a coolant that cools the nitrogen gas released by the second chemical prior to escaping from the narrow end of the inflation device.

In one embodiment, the coolant is a magnesium salt, sand, or steel.

In one embodiment, the magnesium salt is magnesium carbonate, magnesium hydroxide, or both. Since magnesium hydroxide and magnesium carbonate are both coolants, and not fuels, one can use as much as necessary. When such magnesium salts are exposed to the atmosphere, the magnesium hydroxide reacts with $CO_2$ to form magnesium carbonate. Magnesium carbonate is a cement-like material and can therefore also function as a binder. In instances where mixtures are used, the ratio of magnesium carbonate to magnesium hydroxide may be 5:1 to 1:1, preferably 4:1 to 1.5:1, more preferably 3:1 to 2:1.

In one embodiment, the coolant is steel and the steel is in the form of metal chips.

In one embodiment, the wt % of the coolant is 40-90, preferably 50-85, more preferably 60-80% relative to the total wt of the coolant, the first chemical, and the second chemical.

In one embodiment, the coolant may be mixed with the first chemical, the second chemical, or both and in the partition or the double walled partition. In an alternative embodiment, the coolant may be separate from the first and second chemical (FIG. 2). In a preferred embodiment, the coolant is present as a coolant bed 110, and is separate from the first and second chemical (FIG. 1). The coolant bed may be located proximal to the narrow first end of the casing, in between the one-way valve and the gas permeable partition that is closest to the narrow first end of the casing. Under this scenario, the hot nitrogen gas generated from the consecutive chemical reactions will pass through a bed of the coolant prior to exiting the inflation device through the one-way valve at the narrow first end.

In addition to controlling the heat of the escaping gas, keeping the inflation device cool to the touch is important for the user. To this end, in one embodiment, the pump-less inflation system further comprises an insulating layer that covers the exterior of the conical casing so that a user may handle the inflation device in the event of excess heat buildup. Exemplary materials used as the insulating material include, but are not limited to, silica aerogel, polyurethane, phenolic foams, urea foams, polystyrene, fiberglass, vermiculite, cork, perlite, rock wool, silica fibers, Kevlar, polyethylene, neoprene, rayon, polyester, cotton, etc. The insulating layer of the present disclosure may refer to a thin film, a layer, a coating, or a spray.

In one embodiment, the pump-less inflating system further comprises a pressure relief device 111 located in the conical casing that releases excess pressure within the inflation device. The pressure relief device is a safety device for release of excess pressure in the conical casing. The pressure relief device operates in conjunction with an aperture in the casing, and is adapted to release pressure at a pressure level lower than the rupture point of the conical casing.

In one embodiment, the pressure relief device is a rupture disc or a pressure relief valve. A rupture disc is a non-reclosing pressure relief device that, in most uses, protects a pressure vessel, equipment or system from overpressure. A rupture disc is a type of sacrificial part because it has a one-time-use membrane that fails at a predetermined differential pressure. The membrane is usually made out of metal, but nearly any material (or different materials in layers) can be used. Rupture discs provide instant response (within milliseconds) to an increase or decrease in system pressure, but once the disc has ruptured it will not reseal. The rupture disc of the present disclosure is adapted to rupture if the pressure inside the conical casing exceeds a predetermined level.

A pressure relief valve is a type of valve used to control or limit the pressure in a system or vessel which can build up during a process. The pressure is relieved by allowing the pressurized gas to flow from an auxiliary passage out of the system. The relief valve is designed or set to open at a predetermined set pressure to protect pressure vessels and other equipment from being subjected to pressures that exceed their design limits. When the set pressure is exceeded, the relief valve becomes the "path of least resistance" as the valve is forced open and a portion of the gas is allowed to escape. The system is then resealed once the pressure within the container is below the threshold limit. The pressure relief valve of the present disclosure is adapted to open and release the pressure from within the casing if the pressure inside the conical casing exceeds a predetermined level.

A common car tire requires about 30-40 psi of pressure for inflation, and the conical casing is advantageously rated to withstand pressures up to about 1,000 psi. In one embodiment, the pressure produced by the inflation system is 50-450, preferably 60-300, more preferably 70-200 psi. In one embodiment, the pressure relief device may be designed to rupture or open at about 450-600, preferably 475-550, more preferably 490-510 psi.

In one embodiment, the pressure relief device is located proximal to the wide second end.

In one embodiment, the pump-less inflation device further comprises a liquid sealant, which escapes from the narrow first end of the inflation device when contacted by the released nitrogen gas.

Liquid sealants have been used previously in condensed gas tire inflation products. Upon entry into a tire or other inflatable object, the liquid sealant then seals any puncture present by accumulating around the opening or puncture within the inflatable object. In terms of the present disclosure, the liquid sealant is a non-flammable liquid sealant. Types of liquid sealants that may be used in the present disclosure include the formulations known in the prior art (e.g. U.S. Pat. No. 5,124,395A and U.S. Pat. No. 5,765,601A).

The liquid sealant is advantageously located within the coolant bed, and mixed with the coolant material. In this scenario, the hot nitrogen gas released from the second chemical will pass through the coolant bed, where the gas will be both cooled by the coolant and will contact the liquid sealant. Upon contact, the gas stream will entrain the liquid sealant particles, and deliver the sealant into an inflatable object. In an alternative embodiment, the liquid sealant is a free flowing liquid that is contained in the segment closest to the narrow first end of the inflation device (such as in the empty segment closest to the one-way valve in FIG. 2). In this case, the hot nitrogen gas produced from the second chemical will entrain the liquid sealant as the gas passes through the segment which contains the liquid sealant, and deliver the sealant into the inflatable object.

In one embodiment, the pump-less inflation device further comprises a pressure gauge 112. The pressure gauge enables a user to gauge the desired pressure that is added to the inflatable object from the pump-less inflation device using pressure measurement known in the art. The pressure gauge is located on the exterior of the inflation device, such that a user may measure the pressure while operating the inflation device. The pressure gauge may be located near the inflation pin or proximal to the wide second end, although the location of the pressure gauge is meant to be non-limiting so long as the it's functional requirements are met.

According to a second aspect, the present disclosure relates to a method of inflating an inflatable object involving inserting the inflation pin of the pump-less inflation device, in one or more of its embodiments, into an air valve of the inflatable object.

The method then involves puncturing the puncturable membrane with a puncturing device to allow oxygen to enter the inflation device and react with the first chemical, which generates heat and decomposes the second chemical, which releases nitrogen gas that escapes from the narrow first end of the inflation device.

In one embodiment, the puncturing device punctures the membrane to allow oxygen to enter the inflating device, and re-seals the punctured membrane to prevent nitrogen gas from egressing from the wide second end. By re-sealing the puncture site of the puncturable membrane, the generated gas from the consecutive reactions may then only escape the inflation device through the one-way valve located at the narrow first end of the casing.

In one embodiment, the pump-less inflation device is designed to be punctured by a puncturing device having i) a hollow cylindrical chamber with an un-sealed first end and ii) a solid circular stop that lies flat on the second end of the cylindrical chamber, effectively sealing the second end. The diameter of the circular stop is wider than the diameter of the cylindrical chamber. In terms of the present method, the puncturing device may puncture the membrane of the inflation device upon inserting the un-sealed first end of the cylindrical chamber through the puncturable membrane until the circular stop of the puncturing device is flush with the punctured membrane. The larger diameter of the circular stop seals the puncture generated by the smaller diameter chamber. Once inserted, the chamber of the puncturing device is located within the inflation device and the circular stop is located outside of the inflation device. The oxygen gas from the atmosphere, which was contained in the chamber, may then initiate the sequential chemical reactions to generate nitrogen, while the circular stop prevents the generated nitrogen gas from escaping through the newly generated puncture site. While this is one example of a puncturing device, and the method of using the inflation device with the puncturing device, it is envisaged that other puncturing methods may also perform similarly and provide the intended results.

Lastly, the method includes inflating the inflatable object with the released nitrogen gas.

Figure 3:
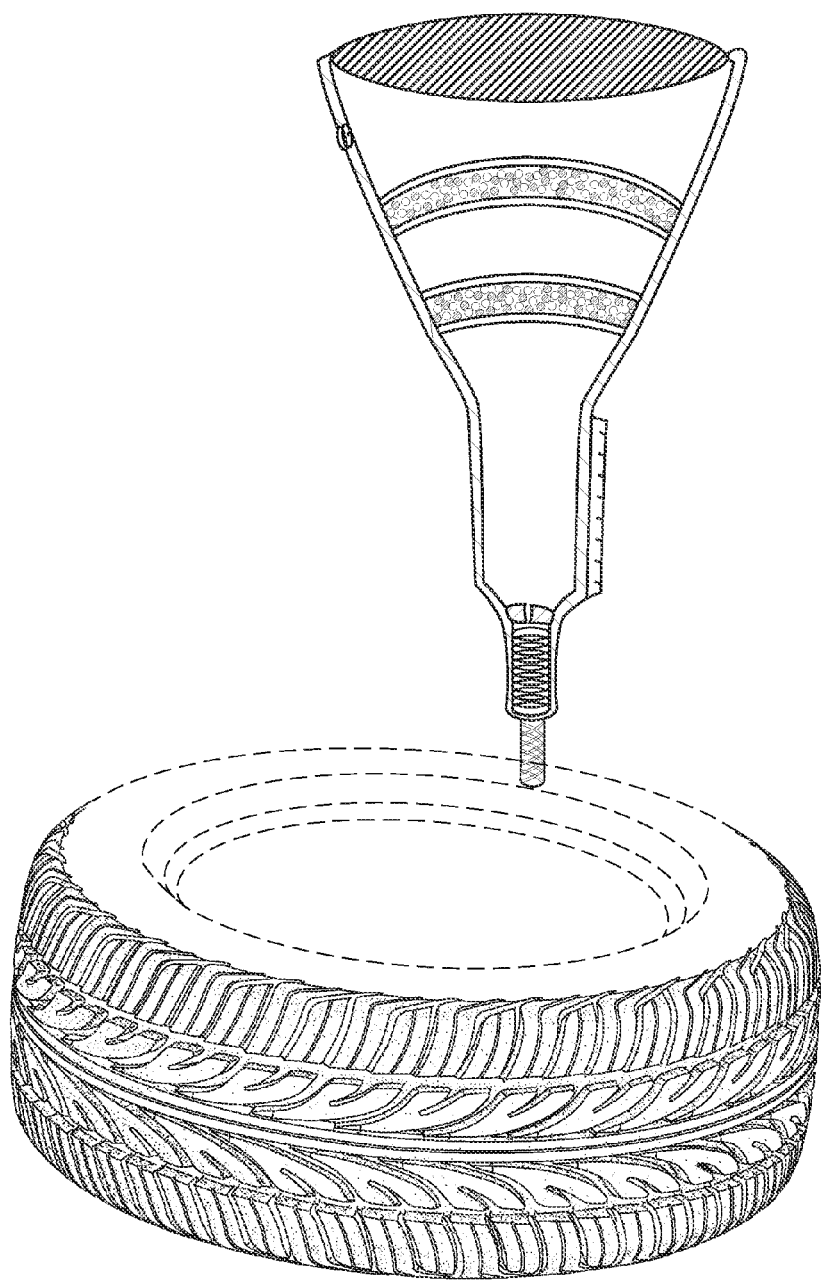
FIG. 3 is an illustration of the pump-less inflation device connected to and inflating a tire.

In one embodiment, the inflatable object is a tire, a boat, a life raft, a life preserver, or an air mattress. The method of inflating a tire is depicted in FIG. 3.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A pump-less inflation device, comprising:
a hollow conical casing with a narrow first end that is connected to an inflation pin and a wide second end;
a puncturable membrane that covers and seals the wide second end;
a one-way valve located proximal to the narrow first end, that prevents gas ingress into the inflation device, and allows gas egress from the hollow interior through the inflation pin at the narrow first end when a pressure threshold is reached;
a first chemical that reacts with oxygen and generates heat; and
a second chemical that decomposes when heated and releases nitrogen gas;
wherein the puncturable membrane and the one-way valve together seal the hollow conical casing,
and wherein puncturing the puncturable membrane allows atmospheric oxygen to enter the inflation device and react with the first chemical, which generates heat and decomposes the second chemical, which releases nitrogen gas that escapes from the narrow first end of the inflation device.

2. The pump-less inflation device of claim 1, wherein the sealed hollow conical casing is filled with an inert gas.

3. The pump-less inflation device of claim 1, wherein the sealed hollow conical casing is evacuated such that substantially no oxygen gas is present.

4. The pump-less inflation device of claim 1, wherein the first chemical is sodium metal, potassium metal, iron sulfide, potassium graphite, spongy nickel or white phosphorous.

5. The pump-less inflation device of claim 1, wherein the second chemical is sodium azide, tetrazole, bistetrazole, bistetrazoleamine, dihydrazinotetrazine, or bistetrazoylaminotetrazine.

6. The pump-less inflation device of claim 1, wherein the wt % of the first chemical is 10-90% relative the total weight of the first and the second chemical.

7. The pump-less inflation device of claim 1, further comprising
a gas permeable partition located in between the narrow first end and the wide second end of the hollow conical casing,
wherein the first chemical, the second chemical, or both are located in between the partition and the wide second end, and the gas permeable partition prevents solids from passing through the partition and escaping from the narrow first end.

8. The pump-less inflation device of claim 7, wherein the gas permeable partition is in the form of a double-walled gas permeable partition, and the first chemical, the second chemical, or both are enclosed within the double-walled gas permeable partition.

9. The pump-less inflation device of claim 1, further comprising a coolant that cools the nitrogen gas released by the second chemical prior to escaping from the narrow end of the inflation device.

10. The pump-less inflation device of claim 9, wherein the coolant is a magnesium salt, sand, or steel.

11. The pump-less inflation device of claim 9, wherein the wt % of the coolant is 40-90% relative to the total wt of the coolant, the first chemical, and the second chemical.

12. The pump-less inflation device of claim 1, further comprising an insulating layer that covers the exterior of the conical casing.

13. The pump-less inflation device of claim 1, further comprising a pressure relief device located in the conical casing that releases excess pressure within the inflation device.

14. The pump-less inflation device of claim 13, wherein the pressure relief device is a rupture disc or a pressure relief valve.

15. The pump-less inflation device of claim 1, further comprising a liquid sealant, which escapes from the narrow first end of the inflation device when contacted by the released nitrogen gas.

16. The pump-less inflation device of claim 1, further comprising a pressure gauge.

17. A method of inflating an inflatable object, comprising inserting the inflation pin of the pump-less inflation device of claim 1 into an air valve of the inflatable object,
puncturing the puncturable membrane with a puncturing device to allow oxygen to enter the inflation device and react with the first chemical, which generates heat and decomposes the second chemical, which releases nitrogen gas that escapes from the narrow first end of the inflation device, and
inflating the inflatable object with the released nitrogen gas.

18. The method of claim 17, wherein the puncturing device punctures the membrane to allow oxygen to enter the inflating device, and re-seals the punctured membrane to prevent nitrogen gas from egressing from the wide second end.

19. The method of claim 17, wherein the inflatable object is a tire, a boat, or an air mattress.

* * * * *